April 19, 1938. P. PRAUSNITZ 2,114,748
METHOD OF MAKING POROUS FILTER BODIES OF PARTICLES OF GLASS
Filed May 2, 1935
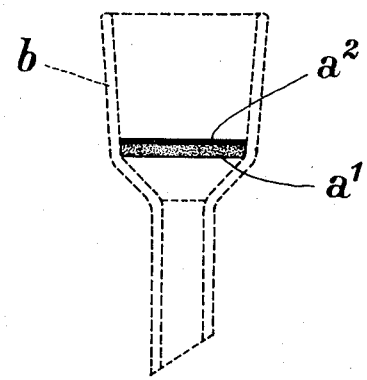
Inventor:
Paul Prausnitz Patented Apr. 19, 1938

2,114,748

UNITED STATES PATENT OFFICE 2,114,748

METHOD OF MAKING POROUS FILTER BODIES OF PARTICLES OF GLASS

Paul Prausnitz, Jena, Germany, assignor to firm Jenaer Glaswerk Schott & Gen., Jena, Germany Application May 2, 1935, Serial No. 19,429
In Germany May 9, 1934

1 Claim. (Cl. 210—205)

The present invention concerns a method of making porous filter bodies comprising two superposed layers of glass particles, the particles of the one layer being coarse grained and those of the other layer being fine grained. Making such filters is very difficult when one of their layers is desired to have very fine pores. When a layer of finely pulverized glass is placed on a layer of coarse material and these layers are being fritted, either the lower layer becomes loose and the upper layer is fritted correctly or the lower layer is fritted correctly and the upper layer is fritted so much that it vitrifies, which means that the desired filtering effect cannot be attained. It would be possible to frit first the layer of coarse grained material and to subsequently frit thereon the fine grained material, but also this method does not provide the desired result, since it proved that the pores of the filters thus obtained are not fine enough and that a layer of fine pores thus obtained does not correctly connect to the layer of wider pores.

According to the invention, which aims at overcoming the said disadvantages, the layer of coarse material is fritted completely, a paste consisting of the finer grained material and an organic liquid is placed on the said layer, and the fine grained paste, or layer, is dried and fritted. It is possible to frit the layer with the fine pores at a temperature at which the fine material is fritted, but not vitrified, and at which the desired volume of pores is not influenced, this temperature being lower than the temperature required for fritting the coarse grained part of the filter. The structure of the lower layer is not influenced by the said temperature because this temperature is too low. It is easily possible to provide that the layer with the fine pores is given a sufficient compactness and frits tightly to the other layer.

For preparing the paste, liquids can be applied which are used in making colours for staining glass, for instance alcohol with cellone lacquer, turpentine and oil, and the like. Also water can be added to the pulverized glass, provided that there is admixed glycerine or another liquid which increases the viscosity and makes it possible to obtain a uniformly distributed and viscous paste which is plastic and does not deposit. When the fritting temperatures and times are correct, extremely compact filter bodies are obtained which have very fine pores in the upper layer and which filter rapidly on account of their slight thickness.

Filter bodies made according to the invention can be fused into non-porous receivers, for instance into filter pots, filter funnels and the like. The fact that fusing such filters into receivers is possible had not been obvious at all, since it had to be expected that the finer upper layer would shrink more in the fire than the lower layer.

The accompanying drawing, which illustrates the invention, represents in section a filter body which is to be fused into a funnel.

The porous body consists of a coarse grained lower layer $a^1$ on which is fritted a fine grained upper layer $a^2$. The non-porous funnel, which is represented by dash lines, is designated $b$.

I claim:

A method of making porous filter bodies of glass comprising two layers of glass particles, the particles of the one layer being coarse and those of the other layer being fine grained, the said method consisting in fritting the coarse grained layer, in placing on this fritted layer a layer of a paste composed of the fine grained particles uniformly suspended in an organic liquid of a viscosity greater than water capable of forming a plastic paste with the fine-grained glass particles, sufficiently viscous to form and maintain a homogeneous suspension thereof, and volatile at a temperature not higher than the subsequent fritting temperature so as to be capable of complete elimination in connection with a subsequently applied fritting treatment, and in drying and fritting this paste, or layer.

PAUL PRAUSNITZ.